US012802857B2

(12) United States Patent
De Mercato

(10) Patent No.: US 12,802,857 B2
(45) Date of Patent: Nov. 17, 2026

(54) TRANSFORMER FRAME STRUCTURE

(71) Applicant: Hitachi Energy Ltd, Zürich (CH)

(72) Inventor: Luigi De Mercato, Varese (IT)

(73) Assignee: Hitachi Energy Ltd, Zürich (CH)

(*) Notice: Subject to any disclaimer, the term of this patent is extended or adjusted under 35 U.S.C. 154(b) by 1089 days.

(21) Appl. No.: 17/640,364

(22) PCT Filed: Sep. 4, 2020

(86) PCT No.: PCT/EP2020/074735
§ 371 (c)(1),
(2) Date: Mar. 4, 2022

(87) PCT Pub. No.: WO2021/043964
PCT Pub. Date: Mar. 11, 2021

(65) Prior Publication Data

US 2022/0328231 A1 Oct. 13, 2022

(30) Foreign Application Priority Data

Sep. 4, 2019 (EP) .................................... 19195396

(51) Int. Cl.
*H01F 27/06* (2006.01)
*H01F 27/26* (2006.01)
*H01F 27/32* (2006.01)

(52) U.S. Cl.
CPC ........... *H01F 27/06* (2013.01); *H01F 27/266* (2013.01); *H01F 2027/328* (2013.01)

(58) Field of Classification Search
CPC ... H01F 27/06; H01F 27/266; H01F 2027/328
(Continued)

(56) References Cited

U.S. PATENT DOCUMENTS 3,371,299 A * 2/1968 Radkowski ............. H01F 27/12 336/60
3,783,426 A * 1/1974 Morris, Jr. ............ H01F 27/263 336/60

(Continued)

FOREIGN PATENT DOCUMENTS

CN 204946686 U * 1/2016
CN 206412182 U 8/2017

(Continued)

OTHER PUBLICATIONS

First Japanese Office Action for Japanese Application No. 2022-514619 mailed Mar. 31, 2023, 6 pages (including English translation).

(Continued)

*Primary Examiner* — Tuyen T Nguyen
(74) *Attorney, Agent, or Firm* — Sage Patent Group

(57) ABSTRACT

A transformer support structure for mounting a transformer assembly includes a bottom element having a support surface with a horizontal orientation including two longitudinal side edges which delimit the support surface. The longitudinal side edges run parallel to each other in a y-direction. A cross bar is supported on the support surface and runs crosswise to the longitudinal side edges. At least two reinforcement units for reinforcing the cross bar extend over an outer front surface of the cross bar in a vertical direction. The reinforcement units are positioned above the longitudinal side edges and are aligned with the longitudinal side edges.

20 Claims, 5 Drawing Sheets

(58) Field of Classification Search
USPC .................................................... 336/55–234
See application file for complete search history.

(56) References Cited

U.S. PATENT DOCUMENTS

| | | | |
|---|---|---|---|
| 2008/0211617 | A1 | 9/2008 | Hrkac |
| 2011/0309902 | A1 | 12/2011 | Bonin |
| 2018/0114632 | A1 | 4/2018 | Hwang |

FOREIGN PATENT DOCUMENTS

| | | | |
|---|---|---|---|
| CN | 206489949 | U | 9/2017 |
| CN | 109841390 | A | 6/2019 |
| EP | 2406798 | B1 | 9/2015 |
| EP | 3319095 | A1 | 5/2018 |
| JP | S5681910 | A | 7/1981 |
| JP | S56106426 | U | 8/1981 |
| JP | H06112051 | A | 4/1994 |
| JP | H1126250 | A | 1/1999 |
| JP | 2017073517 | A | 4/2017 |
| JP | 2018067710 | A | 4/2018 |
| KR | 101815864 | B1 | 1/2018 |
| KR | 101889337 | B1 | 8/2018 |

OTHER PUBLICATIONS

International Search Report and Written Opinion of the International Searching Authority, PCT/EP2020/074735, mailed Sep. 22, 2020, 15 pages.

Extended European Search Report dated Jan. 27, 2020, for European Patent Application No. 19195396.7, 10 pages.

First Chinese Office Action for Chinese Application No. CN 202080062358.0 mailed Aug. 29, 2023, 9 pages (including English Reporting Letter).

Japanese Office Action for Japanese Application No. 2022-514619 mailed Oct. 6, 2023, 6 pages (including English translation).

* cited by examiner

TRANSFORMER FRAME STRUCTURE

CROSS REFERENCE TO RELATED APPLICATIONS

This application is a 35 U.S.C. § 371 national stage application of PCT International Application No. PCT/EP2020/074735 filed on Sep. 4, 2020, which in turn claims foreign priority to European Patent Application No. 19195396.7, filed on Sep. 4, 2019, the disclosures and content of which are incorporated by reference herein in their entirety.

FIELD

Embodiments of the present disclosure relate generally to a support structure for mounting a transformer assembly comprising a bottom element having a support surface with a horizontal orientation including two longitudinal side edges which delimit the support surface, wherein the longitudinal side edges run parallel to each other in an y-direction, a cross bar being supported on the support surface, the cross bar runs crosswise to the side edges; at least two reinforcement units for stiffening the cross bar, the at least two reinforcement units extend over an outer front surface of the cross bar in a vertical direction, wherein the reinforcement units are positioned above the longitudinal side edges and are aligned with the longitudinal side edges.

BACKGROUND

In power engineering, transformers are important structures in substations to connect various voltage levels of the power grid with each other. Substations connect the supra-regional high-voltage grid with the medium-voltage grid of the regional distribution grids. For stable operation the transformers and the coils of the transformer have to be rigidly mounted and fixed so that they are not damaged by the shaking due to external factors. A common construction type of transformers is represented by a dry transformer comprising coils and a base on which the coils are mounted.

Providing a secure and stable power supply all the time can be challenging, particularly in areas where natural disasters are likely to occur. For example, earthquakes can impose a major threat for transformers which can suffer serious damage caused by earth displacements. Also, in areas near to volcanos regular earth shocks and tremors can threaten the substations of the local power grid. Due to the high weight and rigid construction transformers, in particular the coils mounted within the transformers are vulnerable to earth tremors.

Thus there is a need for enhancing the safety and stability of transformers with regard to the above mentioned threats.

SUMMARY

An object of the embodiments can be considered to provide an improved transformer frame structure, which increases the stability and resistance of a transformer to earth shocks and tremors.

In light of the above according to claim 1 is provided. Aspects, benefits, and features of the present disclosure are apparent from the claims, the description, and the accompanying drawings.

According to one aspect a transformer support structure for mounting a transformer assembly is provided. The transformer support structure includes a bottom element having a support surface with a horizontal orientation including two longitudinal side edges which delimit the support surface, wherein the longitudinal side edges run parallel to each other in an y-direction. The transformer support structure incudes a cross bar being supported on the support surface, the cross bar runs crosswise to the side edges. The transformer support structure further includes at least two reinforcement units for reinforcing the cross bar, the at least two reinforcement units extend over an outer front surface of the cross bar in a vertical direction, wherein the reinforcement units are positioned above the longitudinal side edges and are aligned with the longitudinal side edges. Preferably, in a view perpendicular to the support surface, the longitudinal side edges touch or cross the reinforcement units.

That is, the bottom element may include at least a first longitudinal side edge and a second longitudinal side edge and the transformer support structure may include at least a first reinforcement unit and a second reinforcement unit. It may be understood that the first reinforcement unit is aligned with the first longitudinal side edge and the second reinforcement unit is aligned with the second longitudinal side edge. Preferably, in a view perpendicular to the support surface, the first longitudinal side edge touches or crosses the first reinforcement unit and the second longitudinal side edge touches or crosses the second reinforcement unit. It may be understood that the support surface lies in a y-x plane. Thus, it may be understood that in a projection of the transformer support structure in the y-x plane, the first longitudinal side edge touches or crosses the first reinforcement unit and the second longitudinal side edge touches or crosses the second reinforcement unit.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

The term transformer support structure generally refers to transformers structures comprising transformer coils or a combination thereof.

With exemplary reference to FIGS. 1 to 4, embodiments of the transformer support structure according to the present disclosure are described. According to embodiments, which can be combined with other embodiments described herein, transformer structure includes a bottom element having a support surface with a horizontal orientation including two longitudinal side edges which delimit the support surface, wherein the longitudinal side edges run parallel to each other in an y-direction. The transformer structure further includes a cross bar being supported on the support surface, the cross bar runs crosswise to the side edges. The transformer support structure includes at least two reinforcement units for stiffening the cross bar, the at least two reinforcement units extend over an outer front surface of the cross bar in a vertical direction, wherein the reinforcement units are positioned above the longitudinal side edges and are aligned with the longitudinal side edges.

Figure 1:
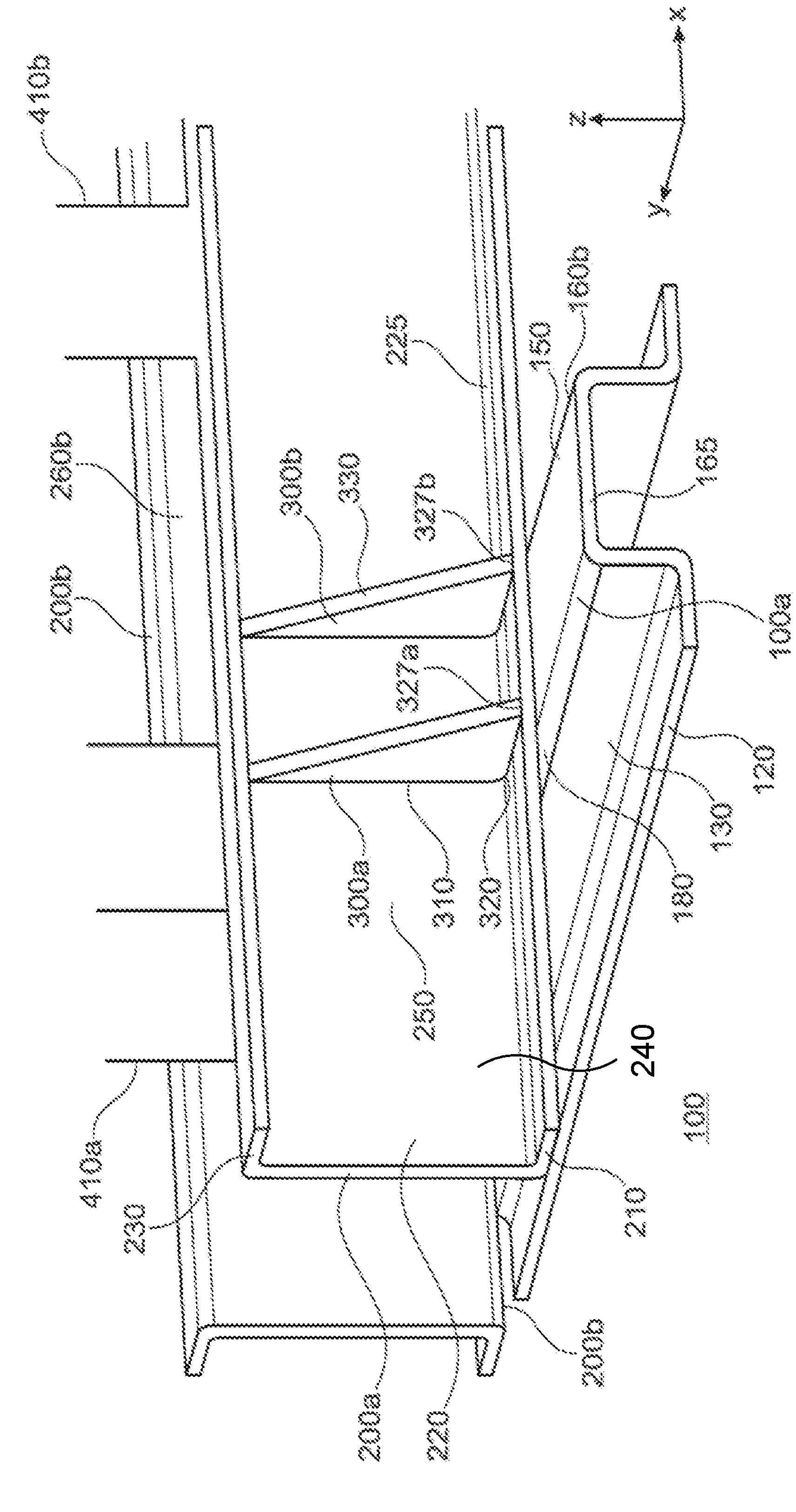
FIG. 1 schematically shows a transformer support structure from a lateral perspective view.

FIG. 1 schematically shows a transformer support structure 100 from a lateral perspective view. The transformer support structure 100 includes a bottom element 120 which stands on the ground. The bottom element 120 has an Omega shaped cross section in the x-z plane. The bottom element 120 includes two lateral sides 130 opposite to each other, which are oriented parallel to the y-z plane. The bottom element 120 provides a support surface 150 with a horizontal orientation in the y-x plane. The support surface 150 has a rectangular shape and is delimited by two longitudinal side edges 160, running parallel to each other along the y-direction, a bottom element front edge 165 and a bottom element rear edge (not shown). Between the longitudinal side edges 160 of the support surface 150 and the lateral sides 130 a curved or sharp edged section 180 is provided, which connects the support surface 150 with the lateral sides 130.

A cross bar 200 is arranged on the support surface 150 of the bottom element 120. According to embodiments, which can be combined with other embodiments described herein, the cross bar 200 has a C- or L-shaped cross section along the y-z plane. The cross bar 200 has a lower leg 210, a middle portion 220 and an upper leg, in case of C-shaped cross section, 230. The lower leg 210 of the C-shaped cross bar 200 is with its bottom side in contact with the support surface 150. The middle portion 220 of the cross bar 200 forms a middle vertical portion 250 of the outer front surface 240 which is parallel to the x-z-plane. At the middle vertical portion 250 of the outer front surface of the cross bar 200 two reinforcement units 300*a* and 300*b* are provided. The reinforcement units 300 are positioned above the longitudinal side edges 160 and are aligned to the longitudinal side edges 160. In particular, the reinforcement unit 300*a* is aligned to the longitudinal side edge 160*a* and the reinforcement unit 300*b* is aligned to the longitudinal side edge 160*b*.

The reinforcement unit 300 has a plate-like shape which forms a longitudinal rear edge 310 running in parallel to the z-axis and being in contact with the middle portion 250 of the outer front surface 240 of the cross bar 200. The reinforcement unit 300 includes a lower edge 320 which is in contact to a lower horizontal surface 225 of the lower leg 210 of the cross bar 200. The lower edge 320 of the reinforcement unit 300 runs parallel to the y-direction on the lower horizontal surface 225. The lower edge 320 run across lower horizontal surface 225 to the outer front edge 327 of the lower horizontal surface 225 along the y-direction. The reinforcement unit 300 forms a longitudinal front edge 330 which extends from the outer front edge 327 to an upper horizontal surface formed on the upper leg 230 of the cross bar 200.

A further cross bar 200*b* is provided on the bottom element 120. The further cross bar 200*b* has the same shape of the cross bar 200 and runs in parallel to the cross bar 200 along the x-direction. The outer front surfaces 240 of each cross bar 200*a*, 200*b* facing in opposite directions to each other. Between the two cross bars 200*a*, 200*b* three transformer columns and a core yoke are arranged (410*a*, 410*b* show just two of the columns). The transformer columns 410 are clamped between the two cross bars 200*a*, 200. In particular, the transformer columns 410 are in contact with the respective rear surfaces 260 of each of the cross bars 200*a*, 200*b*.

Figure 2A:
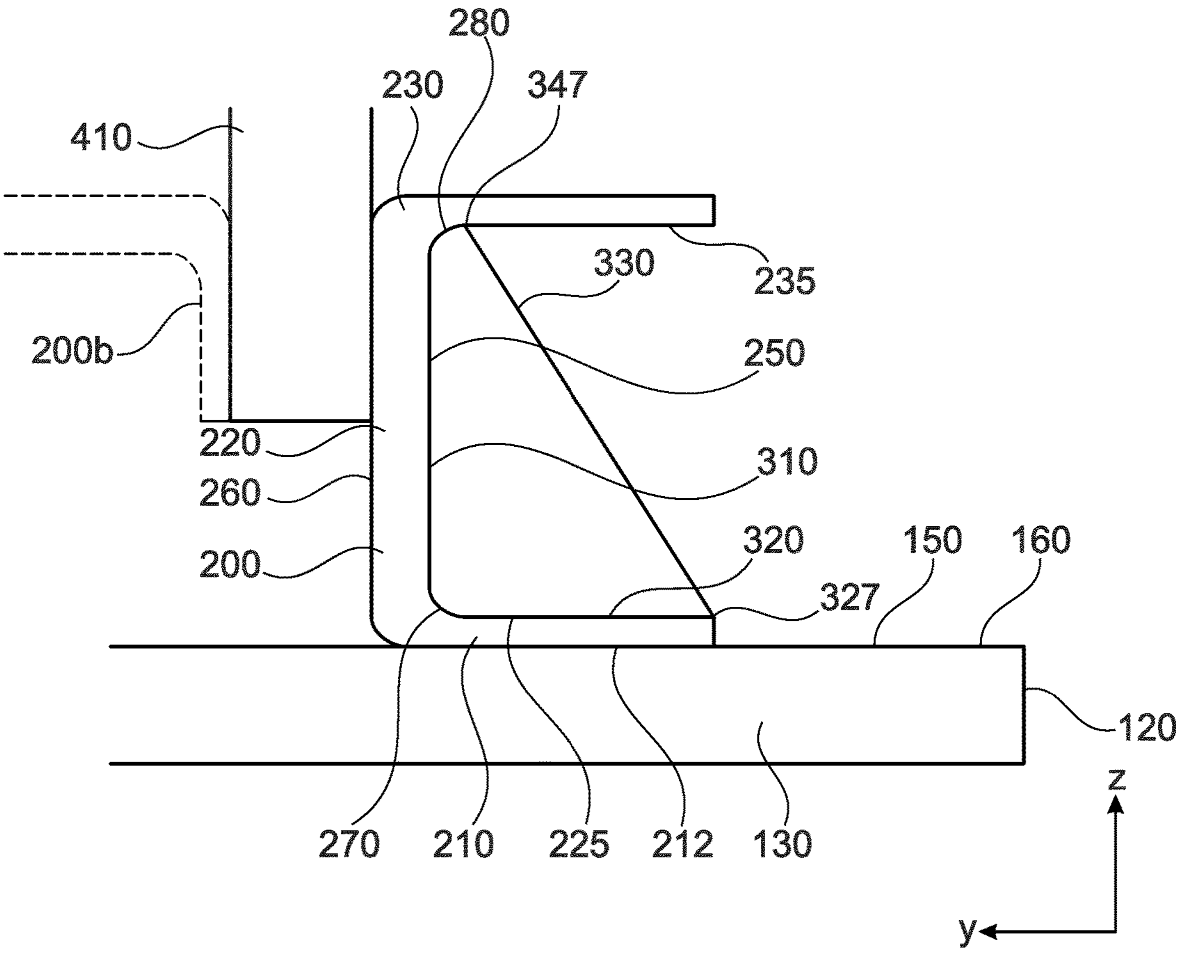
FIG. 2A shows a cross sectional side view in the y-z plane of a section of the transformer support structure.

FIG. 2A shows a cross sectional side view in the y-z plane of a section of the transformer support structure 100. The cross bar 200 is arranged on the bottom element 120. The bottom side 212 of the lower leg 210 of the C or L-shaped cross bar 200 is in contact with the support surface 150. The reinforcement unit 300 is arranged between the lower leg 210, the middle portion 220 and the upper leg 230. The lower edge 320 of the reinforcement unit 300 is in contact with the lower horizontal surface 225 of the lower leg 210. The lower edge 320 extends from the outer front edge 327 of the lower leg 210 along the y direction to a lower corner section 270.

The lower corner section 270 is formed in the intersection between the middle vertical portion 250 of the outer front surface of the middle portion 220 and the lower horizontal surface 225 of the lower leg 210. This means that the lower edge 320 crosses the entire lower horizontal surface 225 along the y-direction. The rear edge 310 of the reinforcement unit 300 is in contact with the outer front surface 240 of the middle vertical portion 250 of the cross bar 200. The rear edge 310 extends from the lower corner section 270 to an upper corner section 280. The upper corner section 280 is formed in the intersection between the middle vertical portion 250 of outer front surface and the upper horizontal surface 235 of the upper leg 230. The rear edge 310 crosses the entire middle vertical portion 250 of the outer front surface along the y-direction.

The reinforcement unit 300, in particular the rear edge 310 of the reinforcement unit 300 is in contact with the upper horizontal surface 235 of the upper leg 230. It can also be understood that the rear edge 310 is abutted against the horizontal surface 235 at the upper corner section 280. The rear edge 310 forms an upper contact edge 347 with the longitudinal front edge 330. The longitudinal front edge 330 runs from the upper contact edge 347 of the reinforcement unit 300 to the outer front edge 327.

The longitudinal front edge 330 running oblique to the z-axis and oblique to the y axis and thereby reinforcing the C-shaped cross bar 200 from the outer front edge 327 of the lower leg 210 to the upper contact edge 347 contacting the upper horizontal surface 235. The reinforcement unit 300 oriented along the y-z plane contacts the upper horizontal front surface 235 within the upper corner section 280 wherein a major part of the upper horizontal front surface 235 remains uncovered along the cross section of the reinforcement unit 300 along the y-direction.

The transformer column 410 and/or the transformer core yoke (not shown) is in contact with the rear surface 260 of the cross bar 200. The transformer column 410 is clamped between the two cross bars 200, 200*b*. The cross bar 200*b* on the left corresponds with the cross bar 200 depicted to the right. The cross bar 200*b* is only indicated by dashed lines. The crossbar 220*b* facing in opposite direction to the crossbar 220*a* and otherwise corresponds to the crossbar 220 including all features described with respect to the transformer support structure 100.

Figure 2B:
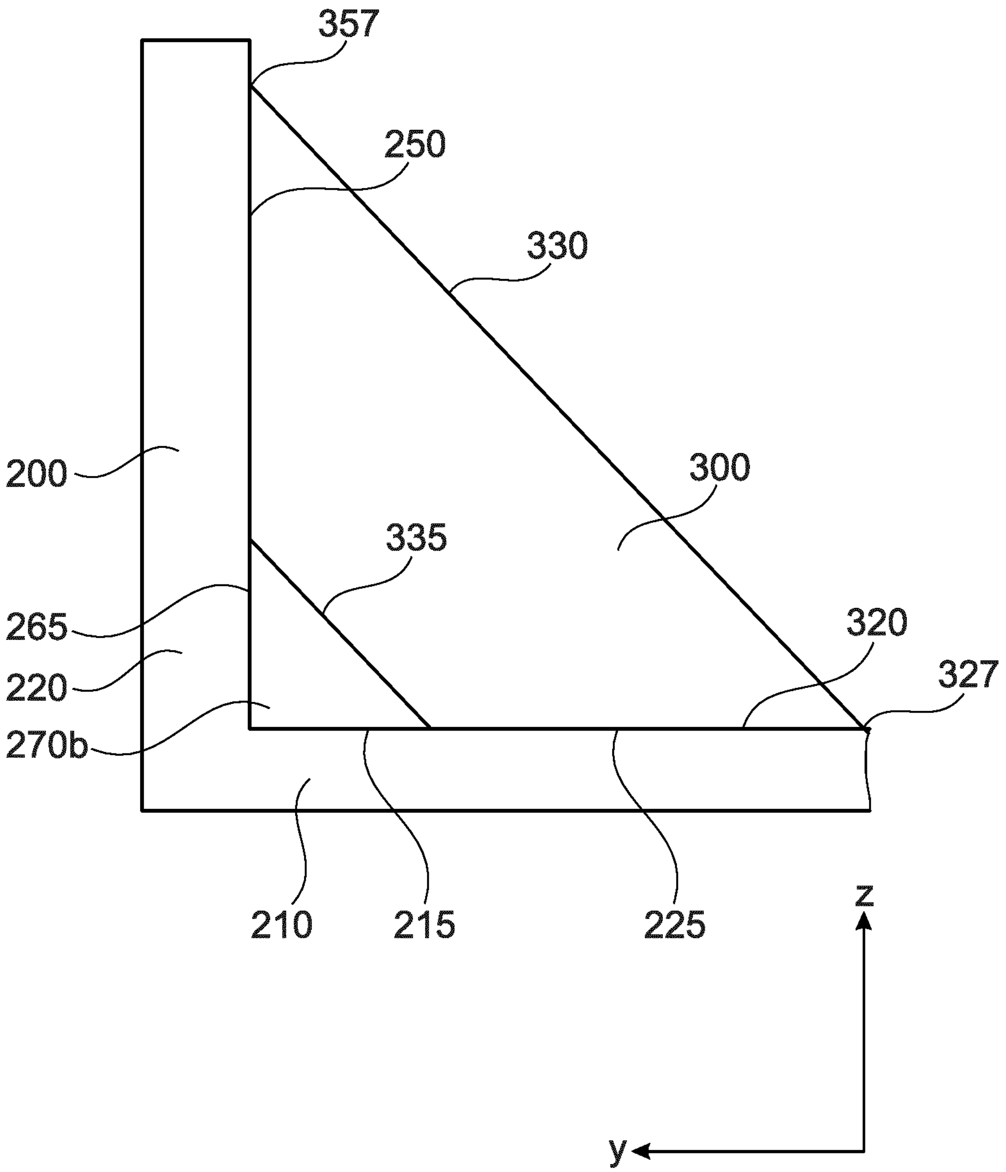
FIG. 2B shows a cross sectional side view in the y-z plane of a section of a further embodiments of the transformer support structure.

FIG. 2B shows a preferred embodiment of a cross sectional side view in the y-z plane of a section of the transformer support structure 100. In contrast to the support structure depicted in FIG. 2A, the cross bar 200 has an L-shaped cross section. The reinforcement unit 300 is arranged between the lower leg 210 and the middle portion 220. The lower edge 320 extends from the outer front edge 327 of the lower leg 210 along the y direction to a lower corner section 270*b*. The lower corner section 270*b* is formed in the intersection between the middle vertical portion 250 of the outer front surface of the middle portion 220 and the lower horizontal surface 225 of the lower leg 210. The lower corner section 270*b* can be understood as an opening or a hole within the reinforcement unit 300. The lower corner section 270*b* is delimited by a bottom edge 335 of the reinforcement unit 300, by a corner section 215 of the horizontal surface 225 and a corner section 265 of the middle vertical portion 250. The lower corner section 270*b* has a triangular shape. The corner section 215 of the horizontal surface 225 and the corner section 265 of the middle vertical portion 250 intersect each other at a right angle. The longitudinal front edge 330 runs from the upper contact edge 357 of the reinforcement unit 300 to the outer front edge 327. The bottom edge 335 of the reinforcement unit 300 runs parallel to the longitudinal front edge 330.

Figure 3:
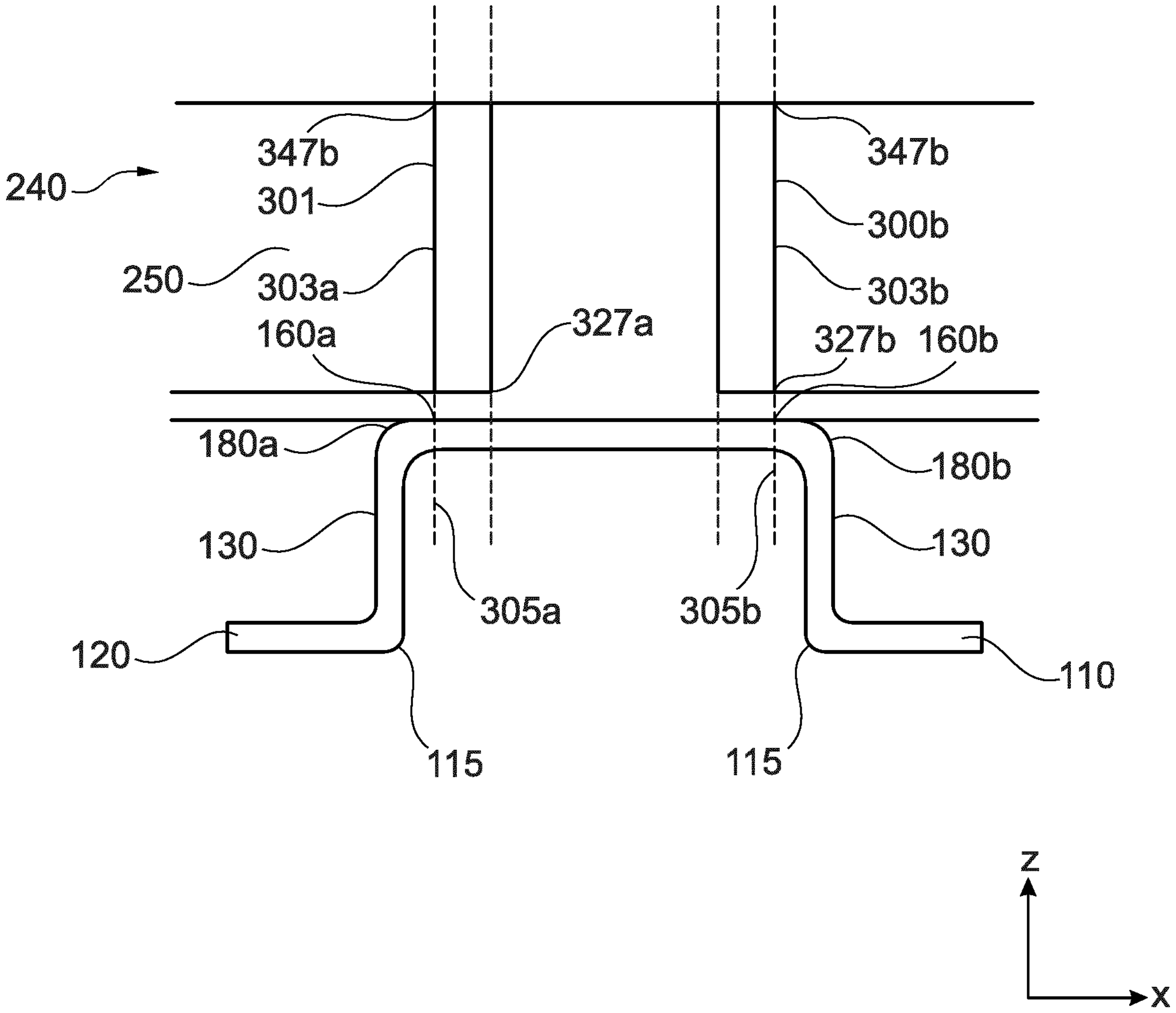
FIG. 3 shows a schematic front view of a section of the outer front surface of the cross bar supported by the bottom element.

FIG. 3 shows a schematic front view of a section of the outer front surface 240 of the cross bar 200 supported by the bottom element 120. The bottom element 120 includes two side legs 110 contacting the ground. The side legs 110 face in opposite directions along the x direction. The side legs 110 are connected to the lateral sides 130 by a curved side leg portion 115 at which the side legs 110 merge into the lateral sides 130. The two side legs 110, the two laterals sides 130, the two curved section 180 and the support surface 150 forming an outer contour of the bottom element 120 in the form of an Omega.

The reinforcement units 300 extend each along the z direction on the middle vertical portion 250 of the outer front surface 240. The outer side edge 303*b* is aligned with the longitudinal side edge 160*b* of the bottom element 120. In particular, an axis 305*b* running along the outer side edge 303*b* of the reinforcement unit 300 crosses the support surface 150 of the of bottom element 120 at the longitudinal side edge 160*b*. Analogously, an axis 305*a* running along the outer side edge 303*a* of the reinforcement unit 300 crosses the support surface 150 of the bottom element 120 at the longitudinal side edge 160*a*. Likewise, the distance between the outer side edge 303*a* and the outer side edge 303*b* along the x direction corresponds with the distance between the longitudinal side edges 160*a* the longitudinal side edge 160*b*.

Figure 4:
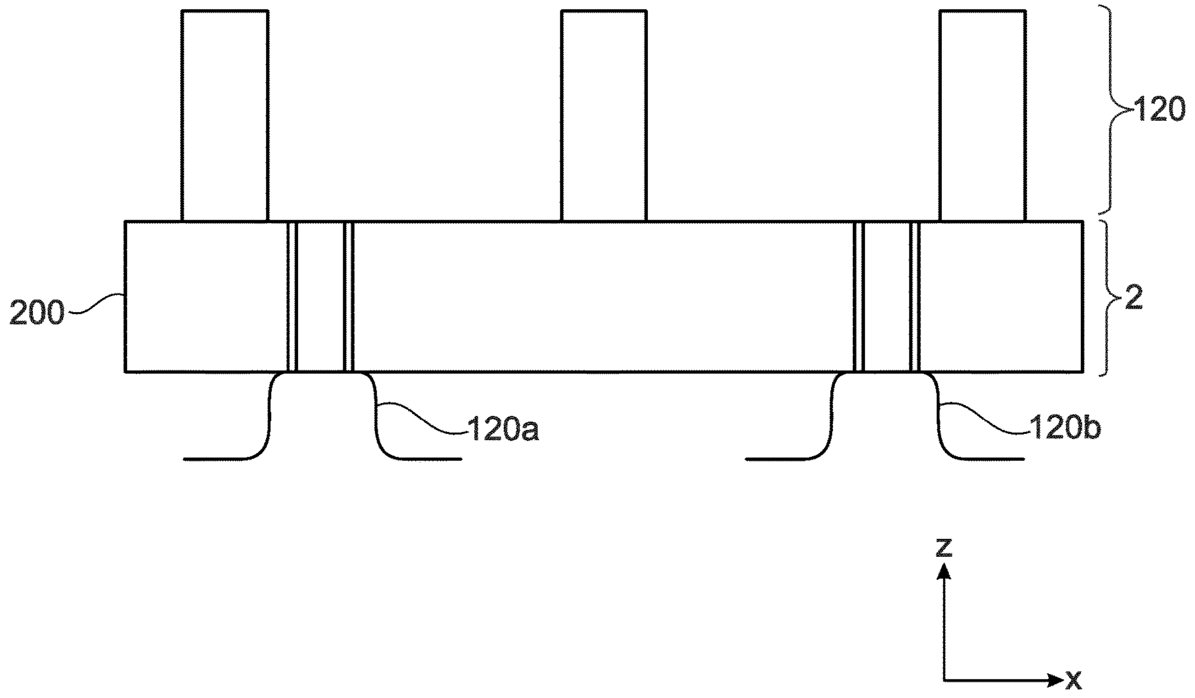
FIG. 4 shows a schematic front view an embodiment of the transformer support structure.

FIG. 4 shows a schematic front view an embodiment of the transformer support structure 100. The cross bar 200 is supported by two bottom elements 120*a* and 120*b* which are positioned apart from each other along the cross bar 200. The transformer columns 410*a*, 410*b*, and 410*c* arranged at the rear surfaces (not shown) of the cross bar 200 and a further cross bar (not shown) facing in opposite direction to each other.

The term "transformer support structure" can be understood as a construction, a linkage assembly or a housing which is able to mount or hold a transformer assembly. The transformer assembly includes transformer core and coils, which can be fixed or attached to the transformer support.

The term "bottom element" can be understood as a support element, a block, support rail or support bar which can be positioned on a ground or on a foundation. The bottom element can have an elongated shape and can be symmetrical. The bottom element includes a support surface facing upwards. The support surface can be a level surface, which runs essentially parallel to the horizontal line and/or runs essentially parallel to the ground level. The support surface includes two side edges, wherein the longitudinal side edges delimit the support surface in two mutually opposite directions. The bottom element can also be fixed at the ground, for example, by means of screws, bolts or the like The longitudinal side edges can be understood as longish side edges on which the support surface of the bottom element slopes outwards or bevels outwards in the x-direction. The longitudinal side edges can be, for example, sharp or pointed. Furthermore, the longitudinal side edges can also be curved or rounded. The longitudinal side edges can be understood as the outermost part of the support surface.

The term "cross bar" can be understood as support rails or support strips which are supported on the support surface of the bottom elements. The cross bar can have, for example, a rectangular or square cross-section along the y-z plane. The term running crosswise can be understood that the cross bar running across to the side edges, in particular, that the orientation of the outer front surface is parallel to the x-z direction and the longitudinal side edges running parallel to the y direction. In other words, the surface normal of the outer front surface can be oriented parallel to the longitudinal side edge.

The cross bar is configured to support the transformer assembly, wherein at least a part of the weight of the transformer assembly rests on the cross bar. The cross bar can be positioned below in the transformer assembly, in particular can be positioned on the bottom side of the transformer assembly. The cross bar can also be positioned laterally to the transformer assembly. The transformer assembly can be fixed on the cross bar for example, by means of screws, bolts or the like. The cross bar can be also be fixed and/or connected at its bottom side with the support surface of the bottom element. Furthermore, it is also possible that the cross bar is supported by the weight on the surface.

The term "reinforcement unit" can be, for example, understood as a reinforcement strut, a reinforcement stray, a thickening or a bulge which is arranged on the outer front surface of the cross bar. The reinforcement unit is configured to increase the bending resistance and/or to stabilize the outer front surface of the cross bar along the z-direction above each of both longitudinal side edges of the bottom element. The reinforcement unit can be plate-shaped defining a plane of the reinforcement unit which is parallel to the y-z plane and wherein the longitudinal side edges of the bottom element are included in the plane of the reinforcement unit. The term "reinforcing" can also be understood as stiffening.

Being aligned with the longitudinal side edges can be understood that a cross sectional projection of the reinforcement unit in a cross sectional plane in the y-x direction include the longitudinal side edges of the bottom element. In other words, it may be understood that in a cross sectional projection of the transformer support structure in a cross sectional plane in the y-x direction, the longitudinal side edge runs through and/or at least partly overlies with the reinforcement unit. The reinforcement unit can run along the z-direction. Being aligned with the longitudinal side edge can also be understood that both the distance between the axis parallel to the z-axis crossing the respective longitudinal side edge and the axis parallel to the z-axis crossing an inner edge of the reinforcement unit and the distance between the axis parallel to the z-axis crossing the respective longitudinal side edge and the axis parallel to the z-axis crossing an outer side edge of the reinforcement unit are equal or smaller than the distance between an side outer edge of the reinforcement unit and an inner edge of the reinforcement unit. In other words, the distance between the longitudinal side edge is equal or less than the thickness in x-direction of the reinforcement unit. Being aligned with the longitudinal side edges can also be understood that each reinforcement unit is centered above the respective longitudinal side edge of the bottom element, in particular that the reinforcement units are centered around a vertical projection of the respective longitudinal side edges along the z-direction. In other words, in a cross sectional projection of the transformer support structure in a cross sectional plane in the y-x direction, each reinforcement unit may be centered about the respective longitudinal side edge. That is, in the y-x projection, each longitudinal side edge may run pass through the respective reinforcement unit, preferably bisect the respective reinforcement unit. Moreover, it may be understood that the term "being aligned with" further includes that the reinforcement units are "parallel to" the longitudinal side edges. That is, it may be understood that in a cross sectional projection of the transformer support structure in a cross sectional plane in the y-x direction, each reinforcement unit is parallel to the respective longitudinal side edge. For example, as can be seen in FIGS. 1, 2A and 3, the reinforcement units 330 are parallel to the longitudinal edges 160. In particular, the lower edge 320 of each reinforcement unit 330 is parallel to the respective longitudinal edge 160.

The above described features of the embodiments can improve the structural integrity and reduce the mechanics during vibrations. Furthermore, the amplitude of oscillation of the transformer support structure can be reduced. In particular, the natural frequency of the transformer support can be increased which can further reduce the impact of an earthquake. The natural frequency of the transformer support structure can be higher than 33 Hz. In particular, the reinforcement units can thereby enhance the stiffness of transformer support, in particular of the cross bar. The effect is increased due to the alignment of the reinforcement units with the longitudinal side edges of the bottom element.

According to embodiments, which can be combined with other embodiments described herein the lengths of the cross bar along the x-direction can be greater than the lengths of the support surface between the two longitudinal side edges along the x-direction.

According to embodiment which can be combined with other embodiments described herein two bottom elements are provided, the bottom elements are spaced apart from each other along the x-direction, and wherein the cross bar is supported on each of the respective support surface. By having two bottom element the cross bar is supported in a more stable and robust way. Furthermore, more than two bottom elements can also be provided. In other words, the transformer support structure may comprise the bottom element and a further bottom element, wherein the further bottom element also includes a support surface and the cross bar is supported by the bottom element and the further bottom element.

According to embodiments, which can be combined with other embodiments described herein two cross bars are provided, the outer front surfaces of each cross bar facing in opposite directions to each other. Providing two cross bars can enhance the overall stability of the transformer support. Providing two cross bars further enables to support the transformer assembly construction where the weight of the transformer can be distributed on both of the cross bars, in particular can be distributed evenly over the two cross bars. In other words, the transformer support structure may comprise the cross bar and a further cross bar, wherein the further cross bar also comprises an outer front surface, wherein the outer front surface of the cross bar and the outer front surface of the further cross bar face in opposite directions to each other.

The cross bars can run parallel to each other. Furthermore, both outer front surfaces can be provided with at least two reinforcement units as described herein. One reinforcement unit on the front side of the first cross bar and the corresponding reinforcements unit on the front side of the second cross bar are positioned above and aligned with the same longitudinal side edge of the bottom element. Thereby, the transformer support is equally stabilized on both opposing sides wherein the overall stability of the support transformer support can be further increased.

According to some embodiments which can be combined with other embodiments described herein, the transformer assembly is arranged in-between the two cross bars. The transformer assembly can be arranged within an interspace formed between the two cross bars. Both cross bars can include inner surfaces directing inwards, wherein the inner surfaces of each cross bar are facing each other respectively. The transformer assembly can be for example clamped between the two cross bars, in particular between the two inner surfaces of the cross bars respectively. The clamping force can be for example generated by means of screws and threads which pull the two cross bars towards each other. The transformer assembly can be also be fixed at one of the inner surfaces for example by means of screws, bolts and the like.

According to embodiments which can be combined with other embodiments described herein, at least one reinforcement unit extends over the major part of the outer front surface along the vertical direction. That is, it may be understood that at least one reinforcement unit of the at least two reinforcement units extends over the major part of the outer front surface along the vertical direction. Preferably, the at least two reinforcement units extend over the major part of the outer front surface along the vertical direction. The at least one reinforcement unit can extend over at least 50%, in particular over more than 75%, or more particularly over more than 90% of the outer front surface along the vertical direction. A reinforcement unit extending over at least 50% of the outer front surface can stabilize the cross bar in an efficient manner by reinforcing the cross bar at particularly mechanically stressed points. At the same time space and material can be saved.

According to embodiments which can be combined with other embodiments described herein at least one reinforcement unit forms a protrusion extending from the outer front surface along the y-direction. That is, it may be understood that at least one reinforcement unit of the at least two reinforcement units forms a protrusion extending from the outer front surface along the y-direction. Preferably, the at least two reinforcement units form a protrusion extending from the outer front surface along the y-direction. The cross section in y-direction of the cross bar can be increased at the respective position of the reinforcement unit on the front surface above the side edges.

According to some embodiments which can be combined with other embodiment described herein a thickness in y-direction of at least one reinforcement unit decreases upwards along the z-direction. The thickness in y-direction of the reinforcement unit can be smaller at an upper part of the outer front surface than at a lower part of the outer front surface. It can also be understood, that the closer a horizontal portion of the reinforcement unit is to the support surface of the support element the larger the thickness in y-direction.

According to embodiments which can be combined with other embodiment described herein the two reinforcement unit have the same shape. In particular, the reinforcement units can be identically. According to some embodiments, all reinforcement units can have the same shape. By using reinforcements units having the same shape, the reinforcement units provide the same stability enhancement above each longitudinal side edges there are provided. Thereby the transformer support can be stabilized in a homogenous manner. Further, this allows a cost effective manufacture of the reinforcement units.

According to embodiments which can be combined with other embodiments described herein, the cross bar has a C-shaped cross section along the y-z plane forming a middle vertical portion of the C-shaped cross section of the outer front surface, an upper horizontal surface portion of the C-shaped cross section and a lower horizontal surface of the C-shaped cross section, wherein the upper and the lower horizontal surfaces facing each other. According to embodiments, which can be combined with other embodiments described herein, the cross bar can have a L-shaped cross section along the y-z plane forming a middle portion vertical portion of the L-shaped cross section of the outer front surface and a lower horizontal surface of the L-shaped cross section. The C-shaped cross section as well as the L-shaped cross section of the cross bar can absorb vibrations more easily and can have reduced mass, in contrast to a cuboid shaped cross bar.

The upper horizontal surface and the lower horizontal surface can have essentially the same size. The middle vertical portion of the C-shaped cross section can be larger than the surface of the upper horizontal surface and the lower horizontal surface. In particular, the middle vertical portion can be at least 30%, or more particularly at least 50%, or more particularly at least 75% larger than the upper horizontal surface and/or the lower horizontal surface.

According to embodiments which can be combined with other embodiments described herein, the reinforcement unit is arranged between the upper horizontal surface and the lower horizontal surface extending in vertical direction along the middle vertical portion of the C-shaped cross section. The lower horizontal surface can form a lower corner section at which the middle vertical portion of the C-shaped cross section of the outer front surface merges or intersects with the lower horizontal surface.

Analogously, the upper horizontal surface can form an upper corner section at which the middle vertical portion of the C-shaped cross section of the outer front surface merges or intersects with the upper horizontal surface. The corner sections can have a curved or rounded outer contour. The reinforcement unit can be arranged in the lower and/or the upper corner section.

According to some embodiments which can be combined with other embodiment described herein, the reinforcement units can be in contact with the outer front surface and with at least one of the lower horizontal surface and the upper horizontal surface. The reinforcement unit can support itself either at lower horizontal surface or the upper horizontal surface respectively. Furthermore, the reinforcement units can also be welded to the outer front surface and to at least one of the lower horizontal surface and/or the upper horizontal surface according to embodiments described herein. The reinforcement unit can also be enclosed or sandwiched between the upper and the lower horizontal surface. Thereby, the c-shaped cross bar can maintain its dimensional stability even under high pressures and/or tensile stresses.

According to some embodiments which can be combined with other embodiments described herein the bottom element comprising two lateral outer sides which run along the z-direction and are perpendicular to the support surface. The bottom element can have, for example, a cuboid or cube shaped form, wherein the two lateral outer sides facing sideways outwards. In particular, the lateral outer sides of the bottom element run in parallel to the reinforcement units. The longitudinal side edge can be formed by the intersection between the support surface and the respective lateral side surface.

The length of a lateral side along the z-direction can be less than 75% of the length of the support surface along the x-direction between the longitudinal side edges, in particular the length of the later side can be less than 60% of the length of the support surface, or more particularly the length can be less than 50% of the length of the support surface. The orientation of the lateral out sides along the z-direction enhance the durability of the bottom element since the vector of gravity runs along the z-direction as well.

According to some embodiments which can be combined with other embodiments described herein, the bottom element includes a curved section at each side edge, wherein the curved section tapers downwards connecting the support surface with the respective lateral outer sides. The curved section can also be beveled or chamfered. The curves section between the support surface and the later sides can improve the oscillation behavior of the transformer support structure.

According to some embodiments which can be combined with other embodiments described herein, the bottom element can have an Omega shaped cross section along the x-z plane. The Omega shaped cross section can be thereby formed by the outer contour of the bottom element. An Omega shaped cross section provide a stable and secure support on the ground.

A transformer arrangement is provided. The transformer arrangement includes a transformer support according to embodiments described herein, wherein the transformer arrangement can provide a transformer core yoke. The transformer arrangement can also include a plurality of coils and transformer core yokes.

This written description uses examples to disclose the embodiments, including the best mode, and also to enable any person skilled in the art to practice the embodiments, including making and using any devices or systems and performing any incorporated methods. While various specific embodiments have been disclosed in the foregoing, those skilled in the art will recognize that there are equally effective modifications. Especially, mutually non-exclusive features of the embodiments described above may be combined with each other. The patentable scope of the disclosure defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A transformer support structure for mounting a transformer assembly comprising:

a bottom element having a support surface with a horizontal orientation including two longitudinal side edges which delimit the support surface, wherein the longitudinal side edges run parallel to each other in a y-direction;

a cross bar being supported on the support surface, the cross bar running crosswise to the longitudinal side edges; and at least two reinforcement units for reinforcing the cross bar, the at least two reinforcement units extending over an outer front surface of the cross bar in a vertical direction, wherein the reinforcement units are positioned above the longitudinal side edges and are aligned with the longitudinal side edges, wherein a lower edge of each of the reinforcement units terminates at a lower horizontal surface of the cross bar, and wherein the lower edge of each of the reinforcement units and a portion of the outer front surface of the crossbar at a lower corner section of the reinforcement unit form an opening in the lower corner section at a lower corner section of the reinforcement unit;

wherein each reinforcement unit is positioned such that, in a view perpendicular to the support surface, an outer side edge of the reinforcement unit is vertically aligned with and positioned directly above a respective one of the longitudinal side edges of the bottom element; and wherein, in a view perpendicular to the support surface, the longitudinal side edges touch or cross the reinforcement units.

2. The transformer support structure according to claim 1, wherein a length of the cross bar along an x-direction is greater than a length of the support surface between the two longitudinal side edges along the x-direction.

3. The transformer support structure according to claim 2, wherein two bottom elements are provided, the bottom elements are spaced apart from each other along the x-direction, and wherein the cross bar is supported on the respective support surfaces of the two bottom elements.

4. The transformer support structure according to claim 1, wherein two cross bars are provided, the outer front surfaces of each cross bar facing in opposite directions to each other.

5. The transformer support structure according to claim 4, wherein the transformer assembly is arranged in-between the two cross bars.

6. The transformer support structure according to claim 1, wherein at least one reinforcement unit extends over a major part of the outer front surface along the vertical direction.

7. The transformer support structure according to claim 1, wherein at least one reinforcement unit forms a protrusion extending from the outer front surface along the y-direction.

8. The transformer support structure according to claim 7, wherein a thickness in the y-direction of at least one reinforcement unit decreases upwards along a z-direction.

9. The transformer support structure according to claim 1, wherein the two reinforcement units have the same shape.

10. The transformer support structure according to claim 1, wherein the cross bar has a C-shaped cross section along a y-z plane forming a middle vertical portion of the C-shaped cross section of the outer front surface, an upper horizontal surface of the C-shaped cross section and the lower horizontal surface, wherein the upper and the lower horizontal surfaces faces each other or wherein the cross bar has a L-shaped cross section along the y-z plane forming a middle vertical portion of the L-shaped cross section of the outer front surface and the lower horizontal surface.

11. The transformer support structure according to claim 10, wherein the reinforcement units are in contact with the outer front surface and with at least one of the lower horizontal surface and the upper horizontal surface.

12. The transformer support structure according to claim 1, wherein the bottom element comprises two lateral outer sides being opposite to each other which run along a z-direction and are perpendicular to the support surface.

13. The transformer support structure according to claim 12, wherein the bottom element comprises a curved section at each longitudinal side edge, wherein the curved section tapers downwards connecting the support surface with the respective lateral outer sides.

14. The transformer support structure according to claim 12, wherein the bottom element has an Omega shaped cross section along an x-z plane.

15. A transformer having a transformer support according to claim 1, comprising a transformer core yoke.

16. A transformer support structure for mounting a transformer assembly, comprising:

a bottom element having a horizontal support surface supported by two lateral sides, wherein the lateral sides run parallel to each other in a y-direction, and respective side legs connected to the lateral sides, the side legs being spaced apart from each other along an x-direction, wherein the horizontal support surface and the side legs are parallel to an x-y plane;

a cross bar supported on the horizontal support surface, the cross bar running crosswise to the lateral sides in an x-direction and comprising a vertical sidewall parallel to an x-z plane and having a lower leg that is parallel to the x-y plane, the lower leg contacting the horizontal support surface of the bottom element; and two reinforcement units for reinforcing the cross bar, the two reinforcement units extending from the lower leg over the vertical sidewall of the cross bar in a z-direction, wherein the two reinforcement units are respectively positioned above the horizontal support surface of the bottom element, wherein a lower edge of each of the reinforcement units terminates at the lower leg of the cross bar, wherein the lower edge of each of the reinforcement units and a portion of the outer front surface of the crossbar at a lower corner section of the reinforcement unit form an opening in the lower corner section at a lower corner section of the reinforcement unit;

wherein, in a view perpendicular to the support surface, each reinforcement unit is positioned such that an outer side edge of the reinforcement unit is vertically aligned and positioned directly above a respective the longitudinal side edge of the horizontal support surface of the bottom element.

17. The transformer support structure according to claim 16, wherein a length of the cross bar along the x-direction is greater than a length of the horizontal support surface between the two longitudinal side edges along the x-direction.

18. The transformer support structure according to claim 17, wherein two bottom elements are provided, the bottom elements are spaced apart from each other along the x-direction, and wherein the cross bar is supported on the respective horizontal support surfaces of the bottom elements.

19. A transformer support structure, comprising:

first and second bottom elements extending in a y-direction and having respective horizontal support surfaces parallel to an x-y plane;

first and second transformer columns supported on respective ones of the horizontal surfaces of the bottom elements and extending in a z-direction; and a pair of cross bars extending in an x-direction, wherein the pair of cross bars have lower legs contacting the horizontal support surfaces of the first and second bottom elements and vertical sidewalls parallel to an x-z plane, wherein inner surfaces of the vertical sidewalls contact the first and second transformer columns;

wherein, in each bottom element, the horizontal support surface is supported by two lateral sides, wherein the lateral sides run parallel to each other in the y-direction, and respective side legs connected to the lateral sides, the side legs being spaced apart from each other along the x-direction;

wherein the cross bars run crosswise to the lateral sides of the bottom elements in the x-direction and have lower legs that are parallel to the x-y plane, the lower legs contacting the horizontal support surfaces of the bottom elements; and wherein the cross bars each comprise two reinforcement units for each bottom element, the two reinforcement units extending from the lower leg over the vertical sidewall of the cross bar in a z-direction, wherein the two reinforcement units are respectively positioned above the horizontal support surface of the bottom element, wherein a lower edge of each of the reinforcement units terminates at the lower leg of the respective cross bar, wherein the lower edge of each of the reinforcement units and a portion of the outer front surface of the crossbar at a lower corner section of the reinforcement unit form an opening in the lower corner section at a lower corner section of the reinforcement unit; and wherein, in a view perpendicular to the support surface, each reinforcement unit is positioned such that an outer side edge of the reinforcement unit is vertically aligned and positioned directly above a respective longitudinal side edge of the horizontal support surface of a respective one of the bottom elements.

20. The transformer support structure according to claim 1, wherein each of the reinforcement units further comprises a longitudinal front edge parallel to the lower edge, the longitudinal front edge extending from an upper portion of the outer front surface of the cross bar to the lower horizontal surface of the cross bar.

* * * * *